United States Patent
Groisman

(10) Patent No.: US 9,039,171 B2
(45) Date of Patent: May 26, 2015

(54) AERATED CONTACT LENS ASSEMBLY

(71) Applicant: THE REGENTS OF THE UNIVERSITY OF CALIFORNIA, Oakland, CA (US)

(72) Inventor: Alexander Groisman, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/869,762

(22) Filed: Apr. 24, 2013

(65) Prior Publication Data

US 2013/0308092 A1 Nov. 21, 2013

Related U.S. Application Data

(60) Provisional application No. 61/637,624, filed on Apr. 24, 2012.

(51) Int. Cl.
*G02C 7/04* (2006.01)

(52) U.S. Cl.
CPC ... *G02C 7/04* (2013.01); *G02C 7/047* (2013.01); *G02C 7/049* (2013.01); *G02C 2202/16* (2013.01)

(58) Field of Classification Search
CPC ...... G02C 7/04; G02C 7/049; G02C 2202/16; B29D 11/0076
USPC ............. 351/159.04, 159.34, 159.24, 159.73, 351/178
See application file for complete search history.

(56) References Cited

U.S. PATENT DOCUMENTS

| | | | |
|---|---|---|---|
| 4,174,156 A | 11/1979 | Glorieux | |
| 6,851,805 B2 | 2/2005 | Blum et al. | |
| 7,097,302 B2 * | 8/2006 | McGregor | 351/159.03 |
| 8,087,777 B2 | 1/2012 | Rosenthal | |
| 8,096,655 B2 | 1/2012 | Daphna | |
| 2006/0290882 A1 | 12/2006 | Meyers et al. | |
| 2008/0186448 A1 * | 8/2008 | Ishak et al. | 351/163 |
| 2011/0228213 A1 | 9/2011 | Legerton | |
| 2012/0147320 A1 | 6/2012 | Legerton | |

* cited by examiner

*Primary Examiner* — Darryl J Collins
(74) *Attorney, Agent, or Firm* — Eleanor Musick; Greer Burns & Crain Ltd.

(57) ABSTRACT

A contact lens assembly includes a proximal layer formed from a gas-permeable material, a distal layer with an optical element, an air cavity disposed between the proximal layer and the distal layer, wherein oxygen concentration across the air cavity is substantially uniform, and an gas transport region surrounding the air cavity for communicating gas between the air cavity and atmosphere. The contact lens assembly may further include a plurality of fins disposed within the air cavity where the plurality of fins has openings therethrough. One or both of the upper and lower surfaces of the air cavity may have an anti-reflection coating formed thereon.

20 Claims, 6 Drawing Sheets

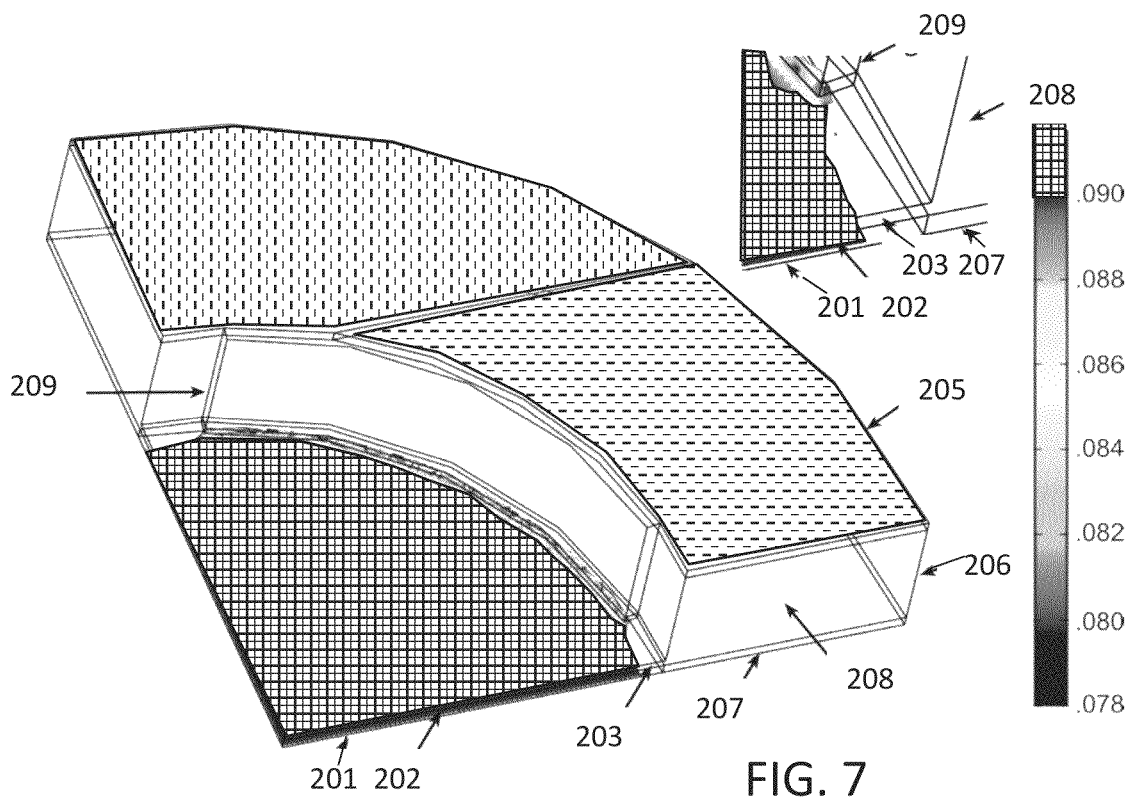
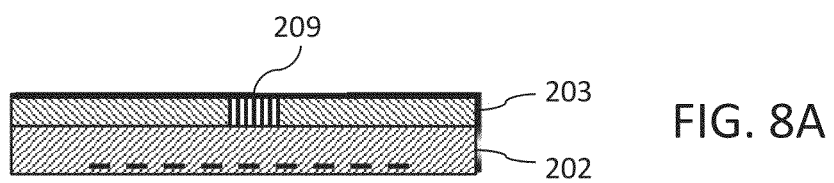
FIG. 8A
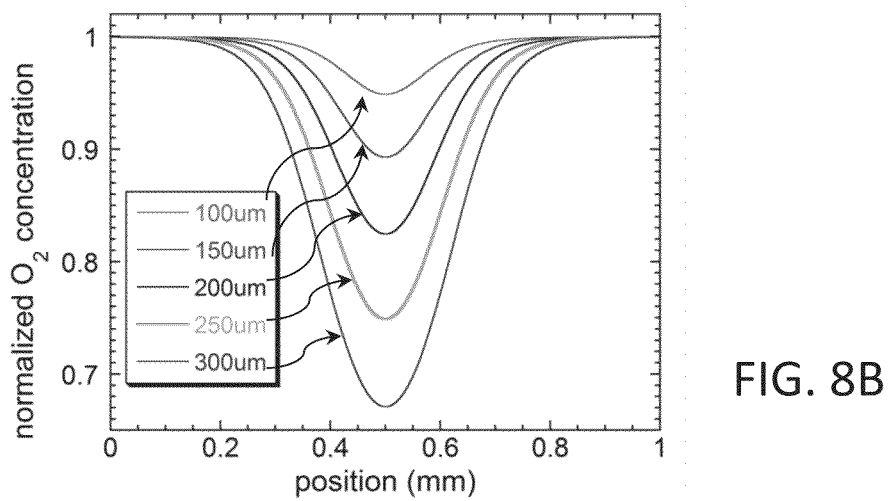
FIG. 8B

AERATED CONTACT LENS ASSEMBLY

RELATED APPLICATIONS

The present application claims the benefit of priority of U.S. Provisional Application No. 61/637,624, filed Apr. 24, 2012, which is incorporated herein by reference in its entirety.

BACKGROUND OF THE INVENTION

Most contact lenses on the market today are made of rigid gas permeable (RGP) plastics, hydrogels, or composite silicone-hydrogel materials. An essential requirement to contact lenses is oxygen permeability, so that the cornea of the eye, which lacks vascularization, has access to atmospheric oxygen and remains healthy when the lens is worn over a prolonged period of time. Materials have been developed that are optically transparent, durable, and have high oxygen permeability. A common requirement for a contact lens is that its oxygen permeability, $D_k$, must be higher than $10\text{-}20 \times 10^{-9}$ cm/s×[mL $O_2$/mL material×mmHg]. The highest oxygen permeability of the currently-used RGP plastics is $\sim 150 \times 10^{-11}$ cm$^2$/s×[mL $O_2$/mL material×mmHg] (examples include MENICON Z® (Menicon Co. Ltd., Japan) and BOSTON XO2® (Bausch & Lomb, Inc., Rochester, N.Y.)), which limits the thickness of contact lenses that can be practically manufactured to ~1 mm.

Scleral (>18 mm diameter) and mini-scleral (diameter 15-18 mm) lenses are configured to avoid contact with the cornea by vaulting the entire cornea and limbus. Such lenses have a number of advantages and benefits over contact lenses that are worn on the cornea (corneal contact lenses), hydrogel lenses and hybrid lenses, especially for a significant segment of patients with ametropia and ocular surface disease who struggle with limited wearing time or incomplete correction of their refractive error and presbyopia. Importantly, whereas corneal contact lenses are normally made of soft materials such as silicones and silicone/hydrogel composites, scleral contact lenses are usually made of RGP plastics. The relatively large size of scleral and semi-scleral lenses makes them a potentially more suitable platform for incorporation of multi-component optical assemblies. Such lens assemblies may include combinations of one or more filters with refractive lenses and/or diffractive lenses, and mirrors. The optimal thickness of such assemblies may exceed the ~1 mm limit beyond which the oxygen permeability of presently-available RGP plastic becomes insufficient. Furthermore, construction of such assemblies may necessitate the use of oxygen-impermeable materials, which would block the transport of oxygen from the atmosphere to the cornea, making the lens unsuitable for extended wear.

Whereas composite lens assemblies are known in the art, the stated purposes of such lenses are to provide multiple optical modifications or adaptable optics rather than to improve delivery of oxygen to the cornea. For example, U.S. Pat. No. 6,851,805 of Blum et al. describes oxygen-permeable materials of which the inner and outer lens surfaces may be made as well as the creation of a rigid, non-permeable capsule configured to retain an electro-active lens. The issue of oxygen transport is not addressed in this patent. Both the capsule and the electro-active lens would interfere with oxygen transport, such that the oxygen exchange capability would be limited and not appreciably improved relative to a monolithic contact lens with the same external dimensions.

Other patents by Rosenthal (U.S. Pat. No. 8,087,777), Glorieux (U.S. Pat. No. 4,174,156) and Daphna (U.S. Pat. No. 8,096,655) describe layered lens constructions that include a cavity or chamber for retaining a fluid or gel. The oxygen permeability of aqueous solutions is about five orders of magnitude lower than that of air, or of a gas phase in general. As a result, inclusion of a fluid or gel within a cavity will necessarily impair the transport of oxygen through the cavity from atmosphere to the cornea.

Accordingly, the need remains for a contact lens construction that enables the advantages of versatile non-gas-permeable optical elements while providing sufficient transport of oxygen from atmosphere to the cornea, thus making the lens suitable for extended wear.

SUMMARY OF THE INVENTION

The present invention comprises a composite contact lens that provides access to atmospheric oxygen to the cornea, even when the front part of the lens, including major optical elements, is made of a gas-impermeable material. The invention provides for the construction of thick optical arrangements, which may be worn as contact lenses while providing the cornea with sufficient access to the atmospheric oxygen (aeration) and enabling the transport of carbon dioxide from the cornea to the atmosphere.

In an exemplary embodiment, the composite contact lens includes a thin gas-permeable layer that is proximal to (in contact with) the eye surface, an optical device, which is disposed distal from the eye surface and may be gas-impermeable, and a thin air-filled cavity disposed between the proximal layer and the distal layer, where the cavity is exposed to atmospheric oxygen around the perimeter of the assembly. In one embodiment, the gas-permeable layer may be formed from RGP plastic. The cavity may be sealed and the oxygen exposure may occur through a thin (~0.1 mm), large-total-area layer of a gas-permeable material such as a rigid gas-permeable (RGP) plastic around the perimeter of the assembly. The curvatures of the two surfaces of the cavity may be configured so that the cavity has the desired refractive properties. The surfaces of the cavity may be anti-reflection coated to minimize the reflection of light. All surfaces are finished to optical quality.

The air-filled cavity has the oxygen permeability of air (a gas mixture of nitrogen, oxygen, and other components), which is the same as the diffusion coefficient of oxygen in air: ~0.2 cm$^2$/s×[mL $O_2$/mL material×atm], which is more than five orders of magnitude higher than the oxygen permeability of the most permeable RGP plastics. The placement of an air-filled cavity directly above the thin gas-permeable layer effectively provides direct access to oxygen through the thin layer without impairment by the optical element(s).

In one aspect of the invention, a contact lens assembly is provided comprising a proximal layer formed from a gas-permeable material, a distal layer comprising an optical element, an air cavity disposed between the proximal layer and the distal layer, wherein oxygen concentration across the air cavity is substantially uniform, and a gas transport region surrounding the air cavity for communicating gas between the air cavity and atmosphere. In one embodiment, the inventive contact lens assembly may further include a plurality of fins disposed within the air cavity outside of a central region overlying the pupil where the plurality of fins has openings therethrough. One or both of the upper and lower surfaces of the air cavity may have an anti-reflection coating formed thereon. In another embodiment, the gas transport region may be an annular margin disposed concentrically around the distal layer where the annular region is formed from a gas-permeable material. The annular margin may be in the form of a cylindrical or ellipsoidal wall. The gas transport region may further include an air gap in communication with the air cavity.

In another aspect of the invention, a contact lens assembly comprises an inner layer adapted for contact with a scleral portion of a wearer's eye, at least a portion of the first layer comprising a gas-permeable material, an outer layer comprising an optical element, an air cavity defined between a distal surface of the inner layer and a proximal surface of the outer layer, and where oxygen concentration across the air cavity is substantially uniform, and a gas transport region surrounding the air cavity for communicating air between the air cavity and atmosphere. The inventive contact lens assembly may further include a plurality of fins disposed within the air cavity, wherein the plurality of fins has channels therethrough for rapid oxygen diffusion, leading to substantially uniform oxygen concentration within the air cavity. The fins may be formed as a plurality of concentric rings, wherein each ring has at least one oxygen transport channel therethrough. The fins may be formed from a rigid gas-permeable material, and the fins and inner layer may be formed from a single piece of rigid gas-permeable plastic. At least one of the distal surface of the inner layer and the proximal surface of the outer layer may have an anti-reflection coating formed thereon. In one embodiment, the oxygen transport region may be an annular margin disposed concentrically around the outer layer, where the annular margin is formed from a rigid gas-permeable plastic. The annular margin may be in the form of a cylindrical or ellipsoidal wall.

Yet another aspect of the invention is a method for making a contact lens assembly by forming a gas transport region from a gas-permeable material, defining an annular gas transport margin in the gas-permeable material surrounding the gas transport region, forming an optical element from a non-gas-permeable material, and attaching the optical element over the gas-transport region to define an air cavity, wherein the air cavity is contact with the gas transport region so that oxygen transport occurs between the gas-transport margin and the air cavity.

In another aspect of the invention, a method for making a contact lens assembly is provided, where the method includes the steps of forming an eye-proximal part from a rigid gas-permeable plastic, the eye-proximal part having an array of micro-machined radial and azimuthal fins outside of the region to be juxtaposed with the eye pupil, defining an annular gas transport margin in the rigid gas-permeable plastic surrounding the eye-proximal part, forming an optical element, and attaching the optical element over the eye-proximal part with the gas transport margin to define an air cavity, wherein all regions of the air cavity are connected, so that oxygen diffuses freely across the air cavity, and the air cavity is in communication with the gas transport margin, so that gas exchange occurs across the gas-transport margin between atmosphere and the air cavity. The method may further include the step of coating at least one of an upper surface of the gas transport region and the lower surface of the optical element with an anti-reflection coating.

BRIEF DESCRIPTION OF THE DRAWINGS

FIG. 7 illustrates the results of a numerical simulation of the oxygen transport through a model lens.

FIGS. 8A and 8B respectively illustrate a model fin structure and 2-D numerical simulations of oxygen concentration profile using the fin structure.

FIG. 9A is a diagrammatic side elevation of the lens and FIG. 9B is a top view showing the RGP components of the lens of FIG. 9A.

DETAILED DESCRIPTION

For purposes of the following description, certain terms may be used interchangeably while referring to the same object. In particular, the word "gas" includes, but is not limited to, oxygen and carbon dioxide. The terms "communication", "diffusion" and "transport" may be used interchangeably to refer to the movement of gas within and/or across lens components.

Figure 1A:
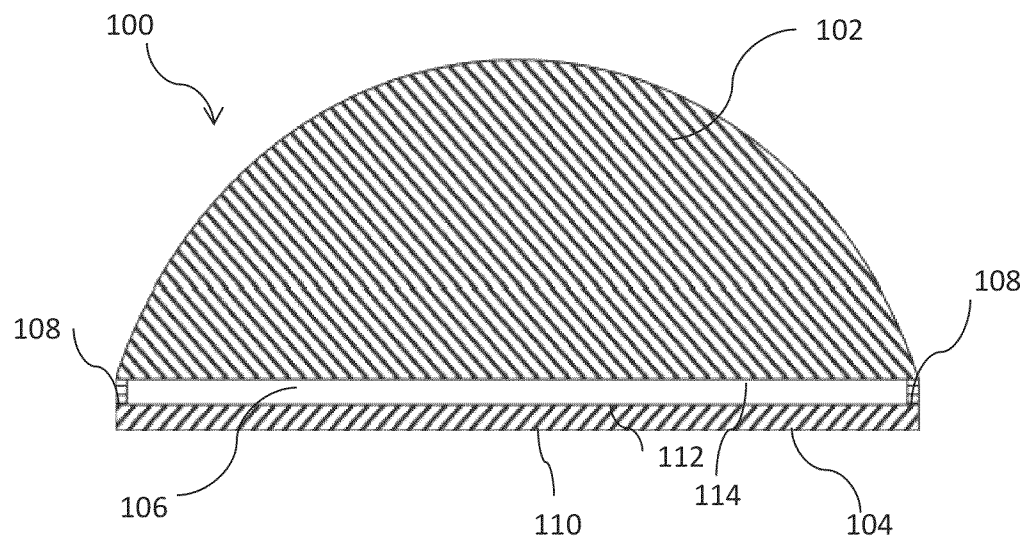
FIG. 1A is a schematic drawing of the cross-section of an embodiment of the invention.
Figure 1B:
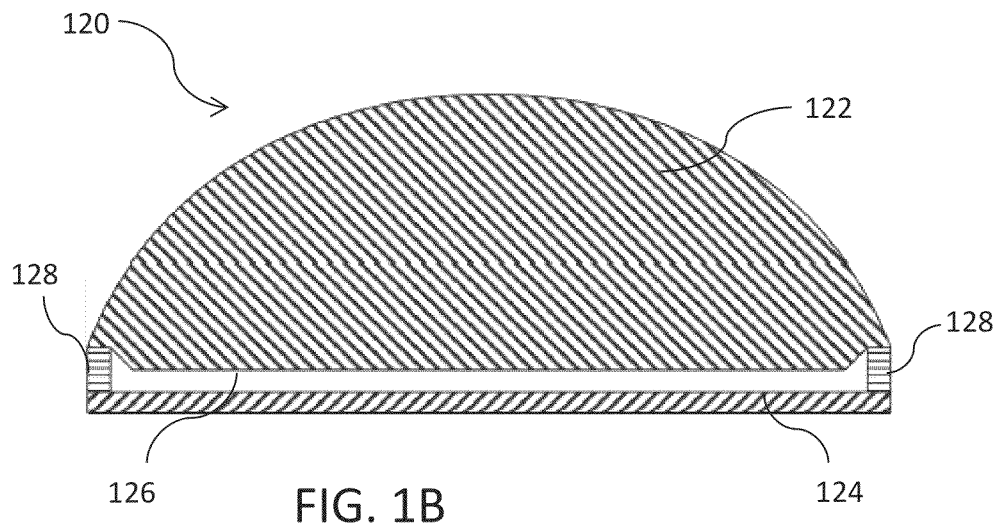
FIG. 1B shows a cross-section of a modified version of the lens, which provides the same oxygen supply.

FIG. 1A provides a schematic drawing of the cross-section of an embodiment of the invention. The composite lens 100 has axial symmetry with three layers: layer 104, a thin oxygen permeable layer adjacent to the surface of the eye, which can be made of an RGP plastic, layer 102, a thick transparent optical assembly, which may be oxygen impermeable, and layer 106, an air-filled cavity. Surface 110 corresponds to the surface of the lens that is immediately adjacent to the eye surface and, although illustrated as a flat surface, will be made with curvature appropriate for the wearer's eye. Surface 110 may be in physical contact with the sclera while avoiding contact with the cornea by vaulting the corneal region, as do conventional scleral lenses. Surfaces 112 and 114 define the lower and upper limits, respectively, of the air cavity 106. Each of surfaces 112 and 114 will preferably be made appropriately curved and may be anti-reflection coated. A thin ring-shaped partition 108 seals the air cavity around the circumference of the lens while allowing sufficient gas permeability by diffusion between the cavity 106 and the surrounding atmosphere. Partition 108, while being gas permeable, should be liquid impermeable to prevent liquids from entering the cavity. It should be noted that the terms "partition", "margin" and "wall" may be used interchangeably in the description of the invention to identify the gas transport feature that surrounds the air cavity and enables the diffusion of gas (at least oxygen and $CO_2$) between the air cavity and atmosphere. FIG. 1B shows a modified version of the lens assembly of FIG. 1A, which provides the same oxygen supply. Lens assembly 120 includes a thick transparent optical assembly (distal layer) 122 which is attached to an oxygen-permeable proximal layer 124. The partition 128 around the lens perimeter is approximately twice as thick as that of the embodiment of FIG. 1A, but also approximately twice as tall, thus providing approximately double the surface area and about the same total gas permeability.

Figure 2A:
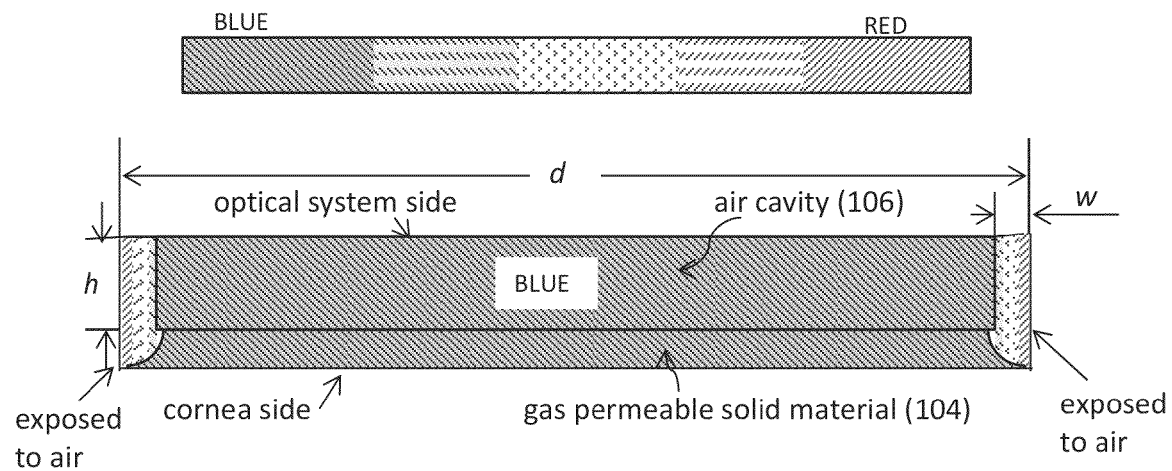
FIG. 2A shows the results of a numerical simulation of diffusion of $O_2$ through layers 1 and 2 of the composite lens shown in FIG. 1A.

A simple estimate of oxygen permeability of the lens and oxygen flux to the cornea can be made as using the parameters shown in FIG. 2A. If the diameter of the lens is d, the width (thickness) of the ring-shaped partition around the perimeter is w, and its height is h, the partition acts as a layer with a total area $A = \pi dh$ and thickness w. The oxygen flux through the partition can then be estimated as $J_1 = D_k A/w = D_k \pi dh/w$, where $D_k$ is the permeability of the material of the partition. In this calculation we assume that the difference in the oxygen concentration between the atmospheric air and the air-filled cavity 106 is equal to unity, the concentration of oxygen in the cavity is uniform (due to fast diffusion), and the thickness of proximal layer 104 is infinitesimally small. The density of flux (flux per unit area) of the lower surface is $j_1 = J_1/(\pi d^2/4) = 4 D_k h/(wd)$. For comparison, if a regular contact lens made of the same material as layer 104 is treated as a disk with a thickness H and diameter d, at a concentration difference equal to unity, the oxygen flux through the lens (ignoring the flux through the cylindrical surface around the perimeter) will be $J_2 = D_k \pi d^2/(4H)$. The ratio between the two fluxes will then be $J_1/J_2 = D_k A/w = 4Hh/(wd)$. If the partition is made sufficiently thin, $w = 100$ μm, and tall, $h = 300$ μm, for a lens diameter of $d = 7$ mm (diameter of the pupil), we have $J_1/J_2 = 1$ at $H = wd/(4h) = 580$ μm. Thus, the composite lens would be as permeable as a disk with a thickness of 580 μm made of the same material as layer 104. (We ignore, again, the flux through the cylindrical surface of the disk.) This calculation needs to be corrected for the actual thickness of the material in layer 104, which is adjacent to the cornea. For a layer 104, a thickness of 200 μm, which would make it sufficiently structurally stable, the composite lens will have the oxygen permeability of a 780 μm thick disk, which would be sufficiently high if layer 104 is machined out of a material with permeability of $\sim 150 \times 10^{-11}$ cm$^2$/s$\times$[mL O$_2$/mL material$\times$mmHg]. In general, the equation for flux density, $j_1 = 4 D_k h/(wd)$, indicates that, as long as the diffusion of air in the cavity is sufficiently fast, a composite lens of any diameter, d, can be made sufficiently oxygen permeable (sufficiently large $J_1$), if the partition separating the cavity from the atmospheric air is made sufficiently thin (small w) and tall (large h).

Figure 2B:
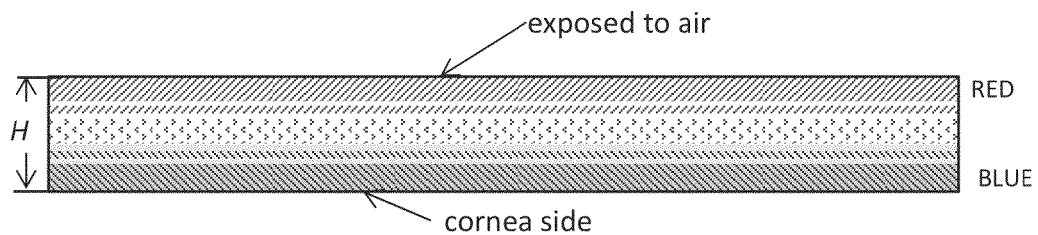
FIG. 2B shows the results of a similar simulation for a uniform disk with d=7 mm and thickness H=0.75 mm, with a uniform high concentration at the top, uniform low concentration at the bottom, and impermeable cylindrical surface.

FIG. 2A illustrates the results of a numerical simulation of diffusion of $O_2$ through layers 104 and 106 of the composite lens shown in FIG. 1A. Concentration of $O_2$ is color/pattern coded (legend is shown above the figure), with red (right slash) corresponding to the highest level (atmospheric air) and blue (left slash) corresponding to the lowest level (surface of the cornea). The computational domain was a disk with a diameter $d = 7$ mm and thickness 0.4 mm, which included 0.15 mm thick layer 104 (diffusion coefficient $1.15 \times 10^{-6}$ cm$^2$/s) and $h = 0.25$ mm thick cavity 106 (diffusion coefficient 0.2 cm$^2$/s). The upper surface of the computational domain was considered $O_2$-impermeable. FIG. 2B shows the results of a similar simulation for a uniform disk with $d = 7$ mm and thickness $H = 0.75$ mm, with a uniform high concentration at the top, uniform low concentration at the bottom, and impermeable cylindrical surface.

A more accurate estimate of the permeability of the composite lens with a cavity comes from a 3D numerical simulation of a composite disk in COMSOL (FIG. 2A), where it is taken $d = 7$ mm, $w = 100$ μm, $h = 250$ μm, 150 μm thickness of layer 104, a diffusion coefficient of $1.15 \times 10^{-6}$ cm$^2$/s for $O_2$ in the material of layer 104 (corresponding to RGP with $D_k = 150 \times 10^{-11}$ cm$^2$/s$\times$[mL O$_2$/mL material$\times$mmHg]), and a diffusion coefficient of 0.2 cm$^2$/s for $O_2$ in air in the cavity 106. The material of layer 102 is considered as $O_2$-impermeable, with no $O_2$ flux through the upper boundary of the computational domain. At 1 unit per m$^3$ difference in $O_2$ concentration between the atmospheric air and the eye side of the lens (lower boundary), the $O_2$ flux through the central 4 mm diameter circle of the lower boundary was $2.02 \times 10^{-12}$ units/s corresponding to a flux density $j_1 = 1.61 \times 10^{-7}$ units/(m$^2$·s). The $O_2$ flux density is higher at the outer margins, and thus the potentially most hypoxic internal area is chosen. Importantly, the simulation indicates practically uniform concentration of $O_2$ of 0.210 unit/m$^3$ (above the concentration at the lower boundary) in the entire cavity (<1% variation). Therefore, in terms of its $O_2$ permeability the composite lens 100 corresponds to a lens made of the material of layer 104 with an effective thickness of 150 μm/0.210 = 714 μm.

In parallel, a numerical simulation of diffusion of $O_2$ through a monolith disk with $d = 7$ mm and thickness $H = 750$ μm (FIG. 2B) was performed, for which a diffusion coefficient $1.15 \times 10^{-6}$ cm$^2$/s was assumed (the same as for layer 104 in the composite lens), a 1 unit/m$^3$ $O_2$ concentration difference between the two flat faces (facing the atmospheric air and eye) was set, and zero diffusion through the cylindrical circumference was chosen. The $O_2$ diffusion flux density through the lower boundary was uniform and was calculated at $j_2 = 1.53 \times 10^{-7}$ units/(m$^2$·s). The diffusion flux density through a disk of a thickness $H = 714$ μm was $j_2 = 1.61 \times 10^{-7}$ units/s (again, neglecting the diffusion through the cylindrical surface). A direct analytical calculation gave the same number, $j_2 = D_k/H = 1.61 \times 10^{-7}$ units/s. Therefore, the oxygen flux through the composite lens of this schematic embodiment of the invention is equivalent to the flux through a 714 μm thick disk made of the material of layer 104 and can thus provide permeability of $21 \times 10^{-9}$ cm/s$\times$[mL O$_2$/mL material$\times$mmHg], if the material of layer 104 has permeability of $150 \times 10^{-11}$ cm$^2$/s$\times$[mL O$_2$/mL material$\times$mmHg], which is achievable with several currently available RGP polymers.

Figure 3:
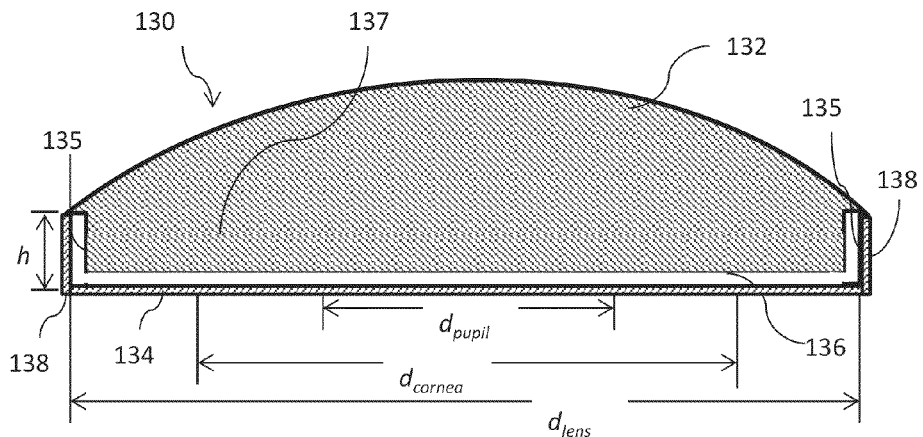
FIG. 3 is a schematic drawing of a cross-section of an exemplary composite aerated mini-scleral contact lens with an air cavity.

FIG. 3 is a schematic drawing showing a composite aerated mini-scleral contact lens with an air cavity 136, which has a diameter $d_{lens} = 15$ mm. The cylindrical partition 138 separating the air cavity 136 on the lens perimeter from the atmospheric air has a thickness $w = 100$ μm, as before, but is now $h = 1$ mm tall, thus conducting enough $O_2$ flux to supply the cornea with sufficient amount of $O_2$. Layer 134 is 100 μm thick as well. The air cavity 136 includes air gap 135, which is defined between cylindrical partition 138 and a lower cylindrical portion 137 of optical element 132.

FIG. 3 illustrates implementation of the concept of $O_2$-delivery to the cornea using an air cavity in a mini-scleral composite contact, which has a diameter $d_{lens} = 15$ mm (as compared to the diameter of cornea, $d_{cornea} = 11.5$ mm), and thus can rest on sclera. To deliver oxygen to a larger area (a circle with diameter of 15 mm instead of 7 mm as in FIG. 2A), the height, h, of the partition around the perimeter separating the lens cavity from the atmospheric air is increased to 1 mm and the thickness of layer 134 is reduced to 100 μm. The diffusion through the lens was simulated again with the $O_2$ concentration difference of 1 unit per m$^3$ between the atmosphere and the surface of the eye under the lens and $150 \times 10^{-11}$ cm$^2$/s$\times$[mL O$_2$/mL material$\times$mmHg] permeability of layer 134. The flux through the 7 mm diameter area of the pupil ($d_{pupil}$), $J_1$, was calculated at $9.6 \times 10^{-12}$ units/s, corresponding to a flux density $j_1 = 2.5 \times 10^{-7}$ units/s, which would be a flux through a uniform disk with a thickness $H = 460$ μm made of the material of layer 134 (cf. FIG. 2B). The concentration of $O_2$ in the air-filled cavity was practically uniform again, at 0.217 unit/m$^3$ above the concentration at the lower surface of layer 134 (cornea), thus indicating again that from the perspective of oxygen permeability, the effective thickness of the composite lens is 100 μm/0.217 = 460 μm, corresponding to a lens permeability of $\sim 33 \times 10^{-9}$ cm/s$\times$[mL $O_2$/mL material×mmHg], if the material of layer 134 has permeability of 150×10$^{-11}$ cm$^2$/s×[mL $O_2$/mL material× mmHg]. The results are substantially improved, if one takes into account the eye sclera, which is adjacent to the annular region of the layer 134 $d_{cornea}$ and $d_{lens}$, is vascularized, and is thus not a sink of oxygen in the same way as the cornea.

The lens assembly of the present invention significantly improves access of the non-vascularized cornea to atmospheric oxygen, making the layer closest to the cornea substantially oxygen permeable and substantially thin to facilitate the delivery of oxygen to cornea.

Figure 4:
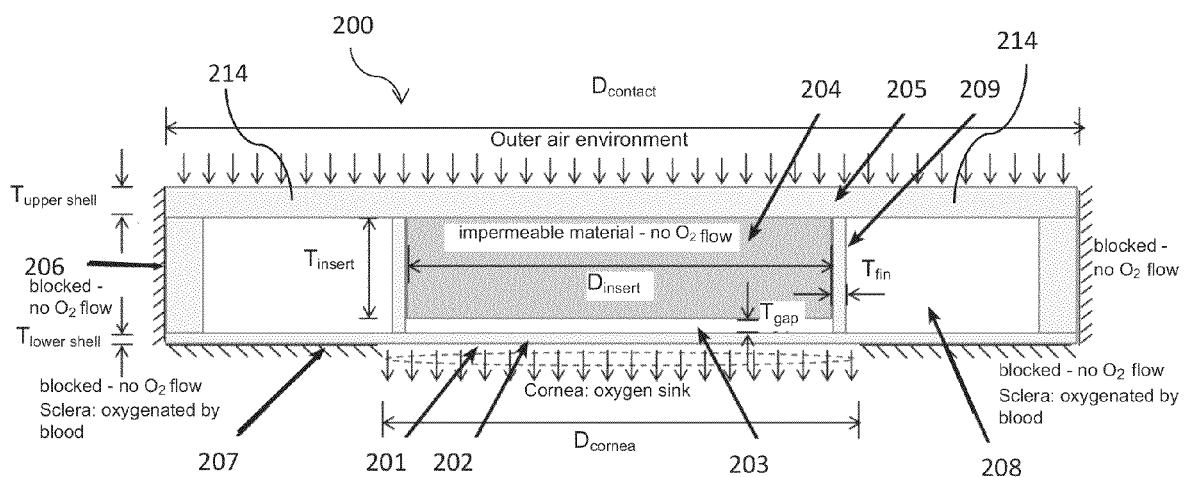
FIG. 4 is a diagrammatic side view of an embodiment of an aerated lens according to the present invention.

Another schematic embodiment of the invention is illustrated in FIG. 4, which shows a simplified axisymmetric model structure incorporating the major features of the inventive contact lens. Circular area 201 indicated by dashed lines at the center bottom corresponds to the location of the cornea. The bottom of the lens assembly 200 proximal to the cornea is a thin layer of rigid gas-permeable (RGP) material 202. Air cavity 203, which provides aeration to the cornea, is defined between the upper surface of gas-permeable proximal layer 202 and the lower surface of a layer of gas-impermeable material 204, representing major optical elements of the contact lens. A gas-permeable upper (distal) shell 205 may optionally be disposed on top of layer 204. A gas-impermeable outer cylindrical surface 206 is illustrated. However, such an element, which was used to create an axisymmetric model for purposes of simulation, would not generally be included in an actual lens. In one embodiment, a gas-impermeable annular layer 207 may be located at the bottom of the assembly encircling the gas-permeable proximal layer 202. Annular layer 207 contacts the sclera, which is oxygenated by blood and, therefore, does not require the same considerations for aeration as does the cornea. Alternatively, layer 207 can be gas permeable, but without any net flux of oxygen through it, because the sclera is vascularized and obtains oxygen from the blood. Therefore, for purposes of simulation, it is assumed that no net flow of $O_2$ occurs through layer 207. An annular void 208 is defined between proximal layer 202, distal layer 205, and RGP partition 209, which corresponds to fins at the bottom (see FIG. 6). Fins 209 provide uniform separation between proximal layer 202 and distal layer 205 to maintain the structural stability of air cavity 203. In an actual lens, the air cavity 203 and annular void 208 would be integral parts of a single interconnected air cavity (cf. FIG. 9).

The key parameters of the model lens illustrated in FIG. 4 and the numeric values used in the simulation are summarized in Table 1 below.

The $O_2$ transport is from the atmosphere through the outer ring-shaped region 214 of the upper layer 205, through the annular void region 208, towards the thin air cavity 203 and from the air cavity 203 through the lower layer 202 towards the cornea 201. An important question about the $O_2$ transport is whether the delivery of $O_2$ is uniform over the area of the cornea, and it can be treated analytically in the basic axisymmetric model. Because of very high diffusivity of $O_2$ in the gas phase in the air cavity, $D_a$=0.2 cm$^2$/s, its distribution is practically uniform along the vertical (z–) direction, and because of the axial symmetry of the lens, the $O_2$ concentration, C, is a function of the radial position only, C(r). We further assume, as the first approximation, that the $O_2$ concentration at the surface of the cornea is uniform and, for the purposes of the calculation, set it to zero. The diffusive flux through the lower layer 202 at a given position, J(r), is then calculated from Fick's law of diffusion as $J(r)=D_p C(r)/T_{lowershell}$. Assume that the diffusion through the lower layer 202 is strictly vertical, because the gradient of $O_2$ across the 150 µm thick layer is much greater than along the 5 mm radius of the cavity 203 which is juxtaposed with the cornea. Under these assumptions, the equation of 2D diffusion of $O_2$ in the cavity is $$D_a\left(\frac{d^2C}{dx^2} + \frac{d^2C}{dy}\right) = J/T_{gap}.$$

The 2D Laplacian (the expression in the parenthesis) can be rewritten in the cylindrical coordinates (given the axial symmetry) as $$\frac{d^2C}{dr^2} + \frac{1}{r}\frac{dC}{dr},$$

making the diffusion equation $$\frac{d^2C}{dr^2} + \frac{1}{r}\frac{dC}{dr} = \frac{D_p}{T_{gap}T_{lowershell}D_a}C$$

TABLE 1

| $T_{upper shell}$ (205) | $T_{lower shell}$ (202) | $T_{insert}$ (204) | $D_{contact}$ (200) | $D_{insert}$ (204) | $T_{gap}$ (203) | $D_{cornea}$ (201) | $T_{fin}$ (209) | $DC_{fin}$ | $H_{eyelid}$ |
|---|---|---|---|---|---|---|---|---|---|
| 150 µm | 150 µm | 1.5 mm | 18 mm | 10 mm | 100 µm | 11 mm | 200 µm | 20% open | 10 mm |

Another key parameter is the $O_2$ permeability of the RGP material of the lens. In an exemplary embodiment, the RGP material is paflufocon D, which is commercially-available from a number of manufacturers, an example of which is PARAGON HDS® 100 from Paragon Vision Sciences. Such RGP material has a permeability of ~100×10$^{-11}$ cm$^2$/s×[mL $O_2$/mL material×mmHg], which for all purposes of the simulation (a steady-state situation) is equivalent to a combination of 100% solubility (the same as in the gas phase) and a diffusion coefficient of $D_p$=0.76×10$^{-6}$ cm$^2$/s. As will be apparent to those in the art, other RGP materials with appropriate gas permeability characteristics may be used.

(where we used the expression for J). We introduce a parameter $$\lambda = \sqrt{\frac{T_{gap}T_{lowershell}D_a}{D_p}}$$

with a dimensionality of length, thus simplifying the diffusion equation to $$\frac{d^2C}{dr^2} + \frac{1}{r}\frac{dC}{dr} = C/\lambda^2.$$

An exact solution of this non-linear partial differential equation involves Bessel functions. However, with the numerical values from Table 1, we calculate $\lambda=6.25$ cm, which is much greater than the maximal value of r in the problem, the radius of the cavity, R=0.5 cm. Since $(r/\lambda)^2$ is always much less than 1, the solution can be well approximated by a parabola $C=C_0 [1+r^2/4\lambda^2]$, where $C_0$ is the $O_2$ concentration in the center of the cavity (r=0). This solution indicates that the $O_2$ concentration varies over the cavity by a factor of only $R^2/4\lambda^2=0.0016$ or 0.16%. Therefore, the $O_2$ concentration and rate of delivery of $O_2$ to the cornea are substantially uniform. These analytical results are in excellent agreement with a numeric simulation (not shown).

For practical implementations of the aerated contact lens, the radius R of the region of the cavity through which the transport of oxygen towards the cornea occurs will be close to the radius of the human cornea (~5 mm), $T_{gap}$ is not likely to be substantially smaller than 100 μm, and $T_{lowershell}$ is not likely to be substantially smaller than 150 μm. Therefore, the relation $(R/\lambda)^2 \ll 1$ will always remain valid, implying nearly uniform distribution of $O_2$ in the cavity and substantially uniform delivery of $O_2$ to the cornea.

Figure 5:
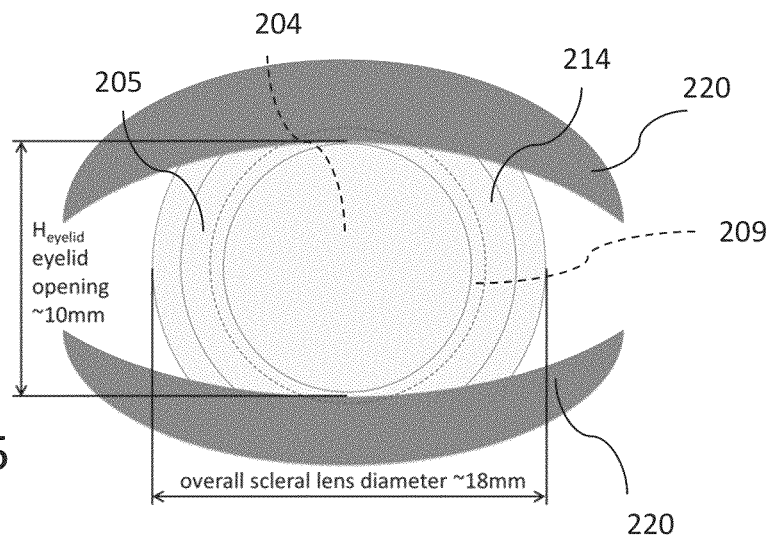
FIG. 5 is a diagrammatic view of the lens of FIG. 4 showing positioning relative to a user's eyelids.
Figure 6:
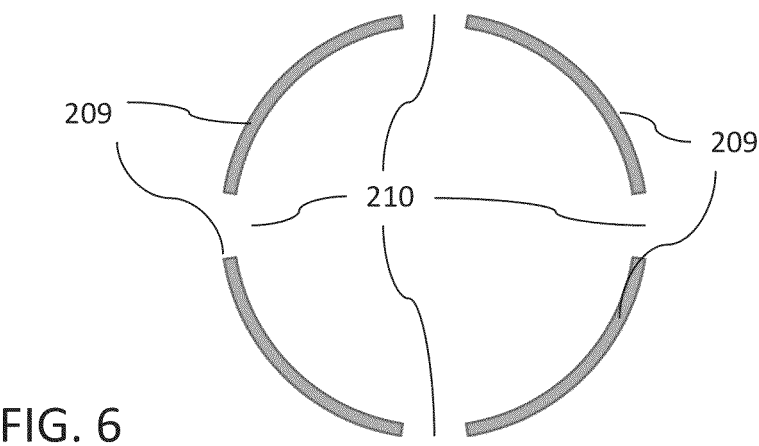
FIG. 6 is a diagrammatic view of exemplary fins and openings around the air cavity.

The accuracy of the basic axisymmetric picture (FIG. 4) can be improved by accounting for two non-axisymmetric features of the model lens: the effect of the eyelids 220 (shown in FIG. 5), which effectively block the transport of $O_2$ through the upper shell outside of a 10 mm wide central strip (whereas the lens diameter is 18 mm) and a set of openings in the fins connecting the annular void region 208 with the air cavity 203 above the lower layer 202. The openings allow the diffusion of $O_2$ only through a portion of the circumference, which has two effects: (i) restriction of the $O_2$ transport from the annular void 208 to the thin cavity 203; (ii) introduction of asymmetry in the distribution of $O_2$ in the cavity. The magnitude of the first effect is defined by the fraction of the circumference constituted by the openings, which is chosen at 20% for the purpose of the first model. In order to account for the second effect and for blocking of the $O_2$ diffusion by the eyelid 220, a full 3D numerical simulation is required. To this end, we used a geometry with only four openings 210, as shown in FIG. 6, which is likely less than an actual contact lens would have, thus deliberately exacerbating the unevenness of the distribution of $O_2$ around the circumference. To reduce the computational domain, we used the fact that even with the eyelid and four openings, the lens has vertical and horizontal planes of symmetry, and simulated quarter of the lens with "symmetry/no transport" boundary conditions on the sides, as shown in FIG. 7.

FIG. 7 illustrates the results of a numerical simulation of the $O_2$ transport through the model lens. The computational domain is one-quarter of the actual lens, with the "no-transport" boundaries at the bottom and on the left corresponding to the horizontal and vertical planes of symmetry of the lens. Distribution of $O_2$ concentration (legend on the right) is shown in a plane at 30 μm from the bottom surface of the lens. Corresponding parts of the lens are numbered as in FIG. 4. As shown, the area of maximum transport, which corresponds to the region of layer 202 located directly below thin cavity 203, is marked with a grid pattern. Inset in the upper right corner of FIG. 7 is a magnified view of a region with an opening in the fin 209 connecting the annular void region 208 with the thin air cavity 203 at the bottom. The vertically-dashed section of the top layer 205 corresponds to the area that would be under the eyelid with no $O_2$ transport, while the horizontally-dashed area of top layer 205 is open to the atmosphere. The boundary conditions are a concentration of 1 over the horizontally-dashed area on the top and 0 over the 11 mm diameter circle marked by the number 1 at the bottom (cornea).

The results of the simulations indicate a nearly uniform distribution of the $O_2$ concentration over a plane at 30 μm distance from the bottom surface 202 of the lens in the 11 mm diameter circle just above the cornea, other than in the immediate vicinity of the fin 209. Azimuthal variations of the $O_2$ concentration are minimal as well, suggesting that it should be sufficient to have only four openings connecting the annular void with the thin cavity 203 above the cornea. A larger number of openings is expected to further improve the azimuthal uniformity. The value of the $O_2$ concentration at the 30 μm distance, ~0.090, suggests that the transport of $O_2$ towards the bottom of the lens (cornea) is equivalent to the $O_2$ transport though a uniform layer of the RGP material (e.g., paflufocon D) with a thickness of 30 μm/0.090=333 μm. Such a layer of paflufocon D is thin enough to ensure sufficient aeration of the cornea.

We further note that the area of the flat ring-shaped region 214 of the top layer 205 of the lens, which is open to diffusion of air from the atmosphere (horizontal dashed area in FIG. 7), is $A_{ring}=78.3$ mm$^2$ (for the entire lens rather than the one-quarter section shown in FIG. 7), whereas the area of the lower layer 202, through which the $O_2$ transport to the cornea occurs, is $A_{lower\ shell}=95.0$ mm$^2$. Therefore, neglecting the variations in $O_2$ concentration across the air-filled regions (annular void 208 and thin cavity 203), the equivalent thickness of the RGP material can be estimated as $T_{equiv}=T_{lowershell}+T_{uppershell} \times A_{lowershell}/A_{ring}=332$ μm, which is practically the same as obtained from the detailed simulation. This result indicates that variations of $O_2$ concentration across the gas-filled (void) regions 203 and 208 can be taken equal to zero, and the concentration of $O_2$ in the interconnected gas-filled regions can be considered uniform for all practical purposes.

Finally, 2D numerical simulations were performed to account for changes in the $O_2$ transport due to the inclusion of fins 209 (made of the same RGP material) that may be formed within the cavity 203 in front of the cornea, excluding the area in front of the pupil, to make it more structurally stable. FIG. 8A shows 2D numerical simulations of $O_2$ concentration profile in a 100 μm thick cavity and 150 μm thick lower shell with a 200 μm wide fin made of RGP (same material as the lower shell) in the cavity. $O_2$ concentration in the cavity is taken uniformly high, with no diffusion upwards, and the concentration $O_2$ concentration at the bottom surface is taken as zero. FIG. 8B shows plots of the distribution of the $O_2$ concentration along a line 10 μm above the bottom (dashed line in (FIG. 8A) for 100, 150, 200, 250, and 300 μm wide fins normalized to the concentration measured outside of the region with the fin. The normalized concentrations are proportional to the local rate of $O_2$ transport towards the cornea. An actual fin will have a finite length (the dimension into the plane of the drawing.) Therefore, the 2D simulation is the worst-case scenario for the reduction in the $O_2$ transport. As for FIG. 7, a proxy for the $O_2$ transport rate is the $O_2$ concentration at a given short distance above the bottom of the lower shell (10 μm in FIG. 8A). The simulation indicates maximal reduction of the local transport rate by 5, 11, 17.5, 25, and 37% for 100, 150, 200, 250, and 300 μm wide fins, respectively. Thus, for example, adding a 250 μm wide fin in an internal area of the thin cavity in the lens in FIGS. 4 and 7, would reduce the local $O_2$ transport under the center-line of the fin to a rate equivalent to that through a uniform 400 μm thick slab of RGP.

The present invention further provides a method for making a contact lens assembly by forming a gas transport layer from a gas-permeable material, the gas transport layer having an outer diameter approximately equal to a diameter of a cornea, defining a plurality of fins abutting the gas transport layer, defining an annular gas transport margin in the rigid gas-permeable plastic surrounding the gas transport layer, forming an optical element from a non-gas-permeable material, and attaching the optical element over the gas-transport layer to define an air cavity, wherein the air cavity is in contact with the gas transport margin so that oxygen transport occurs between the gas-transport margin and the air cavity.

Figure 9A:
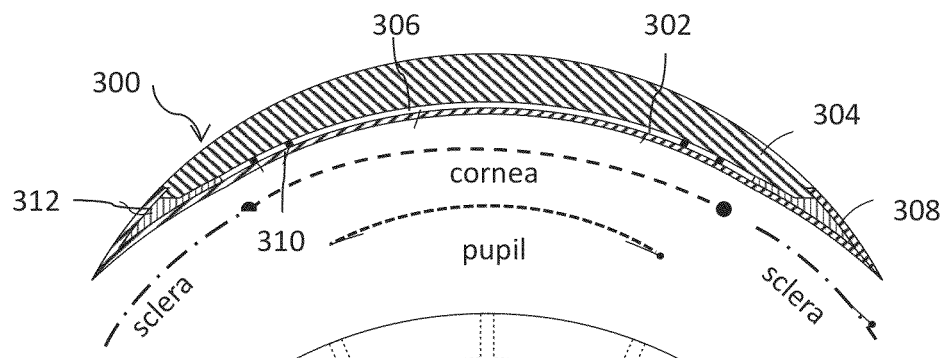
FIGS. 9A and 9B illustrate an exemplary assembly of the inventive contact lens, where
Figure 9B:
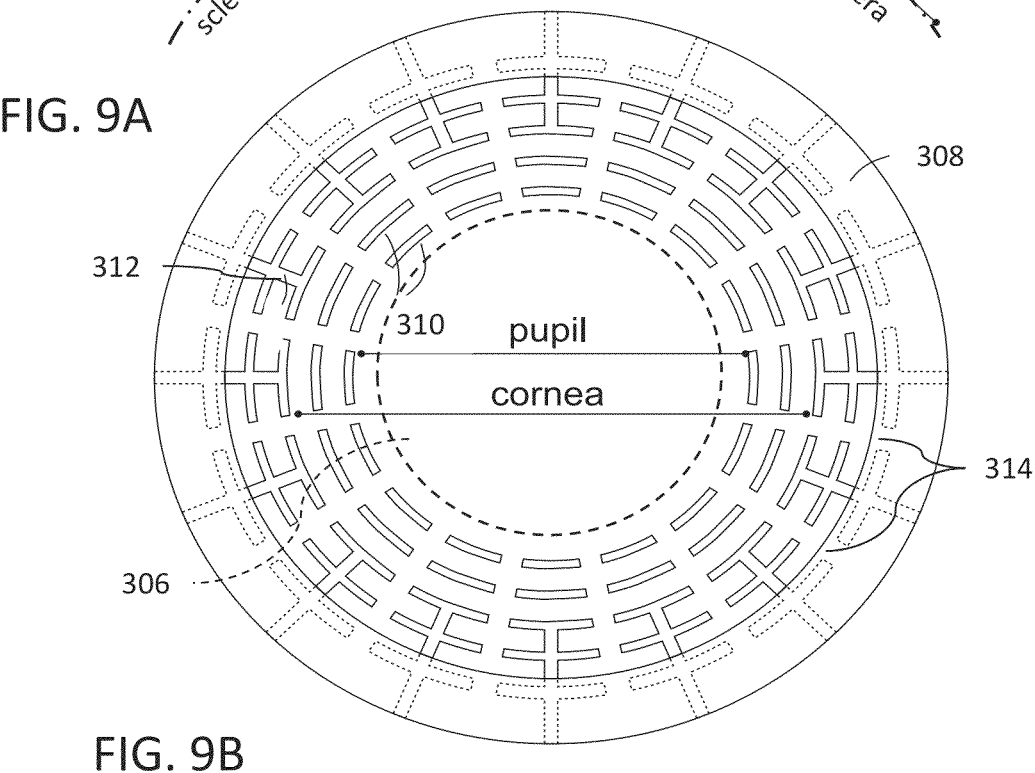

One possible implementation of a contact lens possessing the above-described oxygen transport capability is illustrated in FIGS. 9A and 9B. As in the previously-described embodiment, lens 300 includes proximal layer 302 formed of an appropriate RGP plastic, a distal layer 304 comprising a thick optical element (single piece or an assembly of optical components), and an air cavity 306 defined between the proximal (lower) and distal (upper) layers. A gas-permeable annular region 308, which corresponds to the ring-shaped region 214 of FIG. 4, may be located at the outer perimeter of the lens, thus encircling the distal layer 304. Atmospheric oxygen is transported from the outer (distal) surface of region 308 to air cavity 302. An array of fins 310 may be machined in the same piece of RGP plastic as layer 302. As shown, the fins 310 are formed as a series of concentric rings with open channels 314 extending radially through the rings for oxygen transport from the outer radius, adjacent annular region 308, to the air cavity 306. Additional support vanes 312 may also be machined in the RGP plastic to radially interconnect at least a portion of the fins, providing additional support toward the edges of the lens. Machining may be performed using a combination of a lathe (for the optically clear area in front of the pupil) and a micro-mill. To facilitate handling during processing, it may be desirable to leave the layer 302 somewhat thicker than the specified final thickness. Annular region 308 may be machined from RGP on a lathe to larger-than-final external dimensions then bonded to the assembly of 302, 310, and 312. The combined RGP assembly (302, 308, 310 and 312) forms a recess for receiving optical element 304, which may be machined separately, possibly to larger-than-final external dimensions, and bonded to the assembly of 302, 308, 310, and 312 using conventional bonding methods. As previously stated, it may be desirable to provide an appropriate anti-reflection coating on the lower surface of element 304 and/or the upper surface of layer 302 prior to bonding. The entire construction may then be machined on a lathe to its final specified dimensions required for obtaining the desired correction(s). Additional approaches to fabrication of the inventive contact lens may be apparent to those of skill in the art based on the foregoing simulations and examples.

Using the inventive contact lens design, the supply of oxygen to the entire cornea, including the innermost pupil area, occurs laterally through an air-filled cavity from the inner surface of the marginal layer 308, the outer surface of which is exposed to atmosphere. The oxygen permeability in the cavity is five orders of magnitude greater than that of tear liquid. The high oxygen permeability of the air cavity provides considerable flexibility in the location of the thinned, highly oxygen-permeable area 308 of the surface of the lens that is located over the sclera. As long as there is sufficient access for oxygen transport between the air cavity and the atmosphere, it is largely irrelevant through which part of the lens the atmospheric oxygen obtains access to the air cavity.

The invention claimed is:

1. A contact lens assembly, comprising:
a proximal layer comprising a gas-permeable material;
a distal layer comprising an optical element;
an air cavity disposed between the proximal layer and the distal layer, wherein oxygen concentration across the air cavity is substantially uniform; and
a gas transport region surrounding the air cavity for communicating air between the air cavity and atmosphere.

2. The contact lens assembly of claim 1, wherein the gas-permeable material is a rigid gas-permeable plastic.

3. The contact lens assembly of claim 1, wherein the gas transport region comprises an annular margin formed from gas-permeable material.

4. The contact lens assembly of claim 3, wherein the gas-permeable material is a rigid gas-permeable plastic.

5. The contact lens assembly of claim 3, wherein the annular margin comprises a cylindrical or ellipsoidal partition.

6. The contact lens assembly of claim 5, wherein the distal layer is supported by the cylindrical or ellipsoidal partition.

7. The contact lens assembly of claim 5, wherein the gas transport region further comprises an air gap located adjacent the cylindrical or ellipsoidal partition, wherein the air gap is in communication with the air cavity.

8. The contact lens assembly of claim 1, wherein the air cavity has a distal surface and a proximal surface, and wherein at least one of the distal surface and the proximal surface has an anti-reflection coating formed thereon.

9. A contact lens assembly, comprising:
an inner layer adapted for contact with a scleral portion of a wearer's eye, at least a portion of the first layer comprising a gas-permeable material;
an outer layer comprising an optical element;
an air cavity defined between a distal surface of the inner layer and a proximal surface of the outer layer, wherein oxygen concentration across the air cavity is substantially uniform; and
a gas transport region surrounding the air cavity for communicating air between the air cavity and atmosphere.

10. The contact lens assembly of claim 9, wherein the gas-permeable material is a rigid gas-permeable plastic.

11. The contact lens assembly of claim 9, wherein the gas transport region comprises a cylindrical or ellipsoidal partition formed of a gas-permeable material.

12. The contact lens assembly of claim 11, wherein the gas-permeable material is a rigid gas-permeable plastic.

13. The contact lens assembly of claim 9, wherein the gas transport region further comprises an air gap in communication with the air cavity.

14. The contact lens assembly of claim 9, wherein at least one of the distal surface of the inner layer and the proximal surface of the outer layer has an anti-reflection coating formed thereon.

15. A contact lens assembly, comprising:
a rigid gas-permeable assembly comprising an inner layer having a proximal surface adapted for contact with a scleral portion of a wearer's eye and a partition extending from a distal surface of the inner layer, at least a portion of the partition defining an annular margin surrounding a central portion of the inner layer; and
an optical element supported on the partition to define an air cavity between the inner layer and an inner surface of the optical element;
wherein the annular margin is configured to communicate air between the air cavity and atmosphere.

16. The contact lens assembly of claim 15, wherein the partition comprises a plurality of fins.

17. The contact lens assembly of claim 15, wherein the partition comprises rings concentrically disposed inside of the annular margin, the rings having air transport channels extending therethrough.

18. The contact lens assembly of claim 15, wherein the central portion has a diameter substantially corresponding to a cornea of the wearer's eye.

19. The contact lens assembly of claim 15, wherein the central portion has a pupil area at its center, and wherein the partition is excluded from the pupil area.

20. The contact lens assembly of claim 15, wherein the rigid gas permeable assembly has a recess configured for receiving the optical element.

* * * * *